Aug. 5, 1958  A. D. GREEN  2,846,422
SOLID LIQUID HEAT EXCHANGE IN LOW TEMPERATURE POLYMERIZATION
Filed July 19, 1954  3 Sheets-Sheet 1
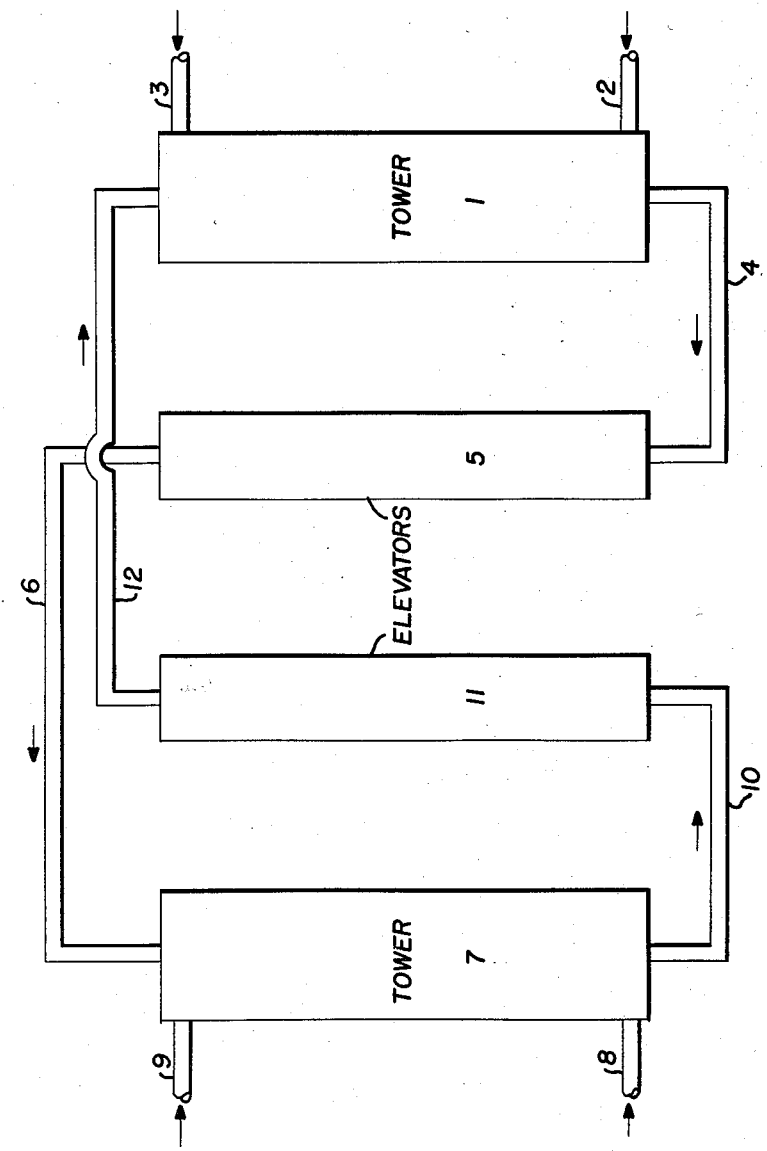
FIGURE-1
ARTHUR D. GREEN  Inventor
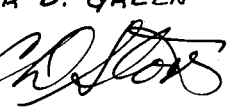  Attorney

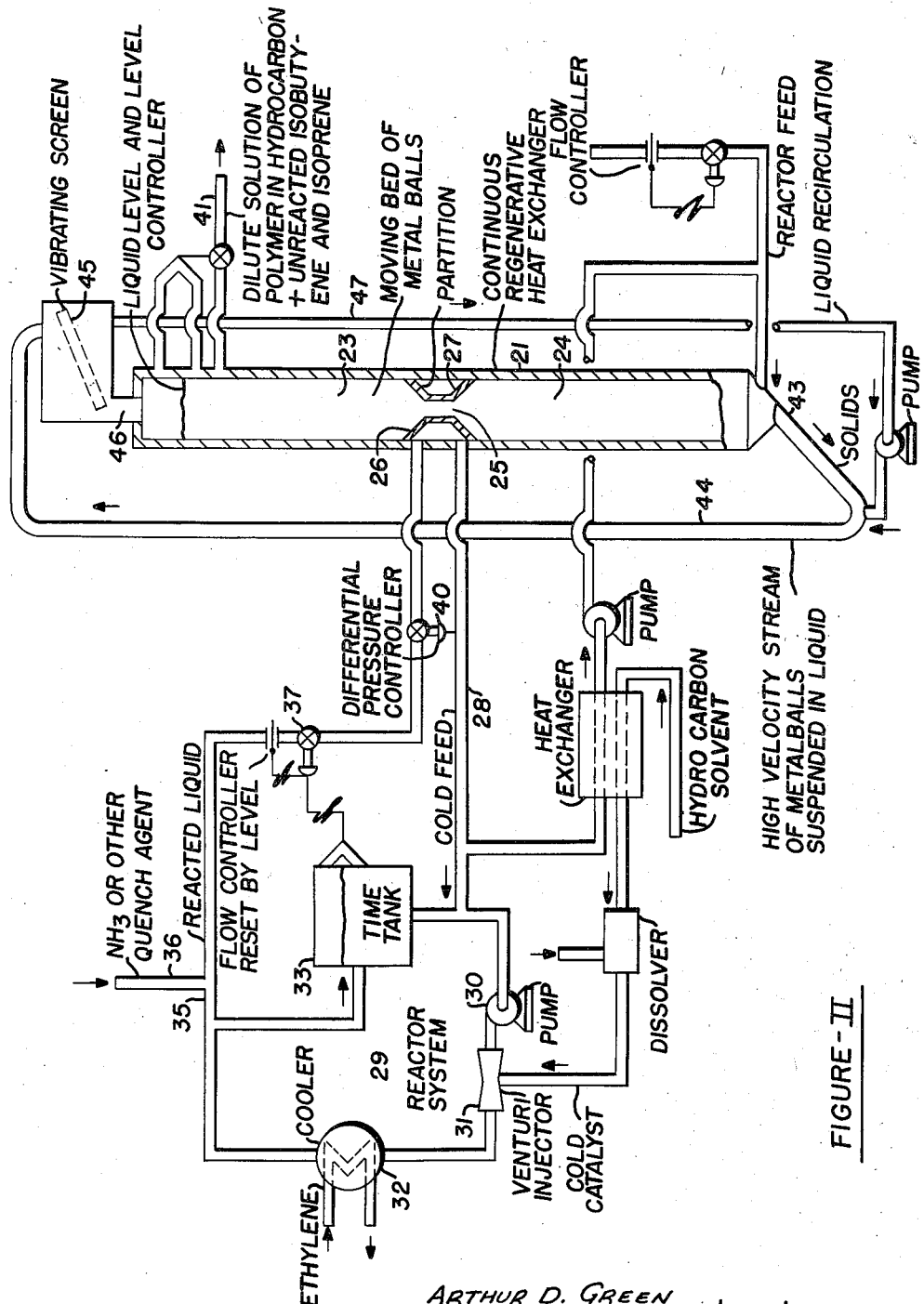

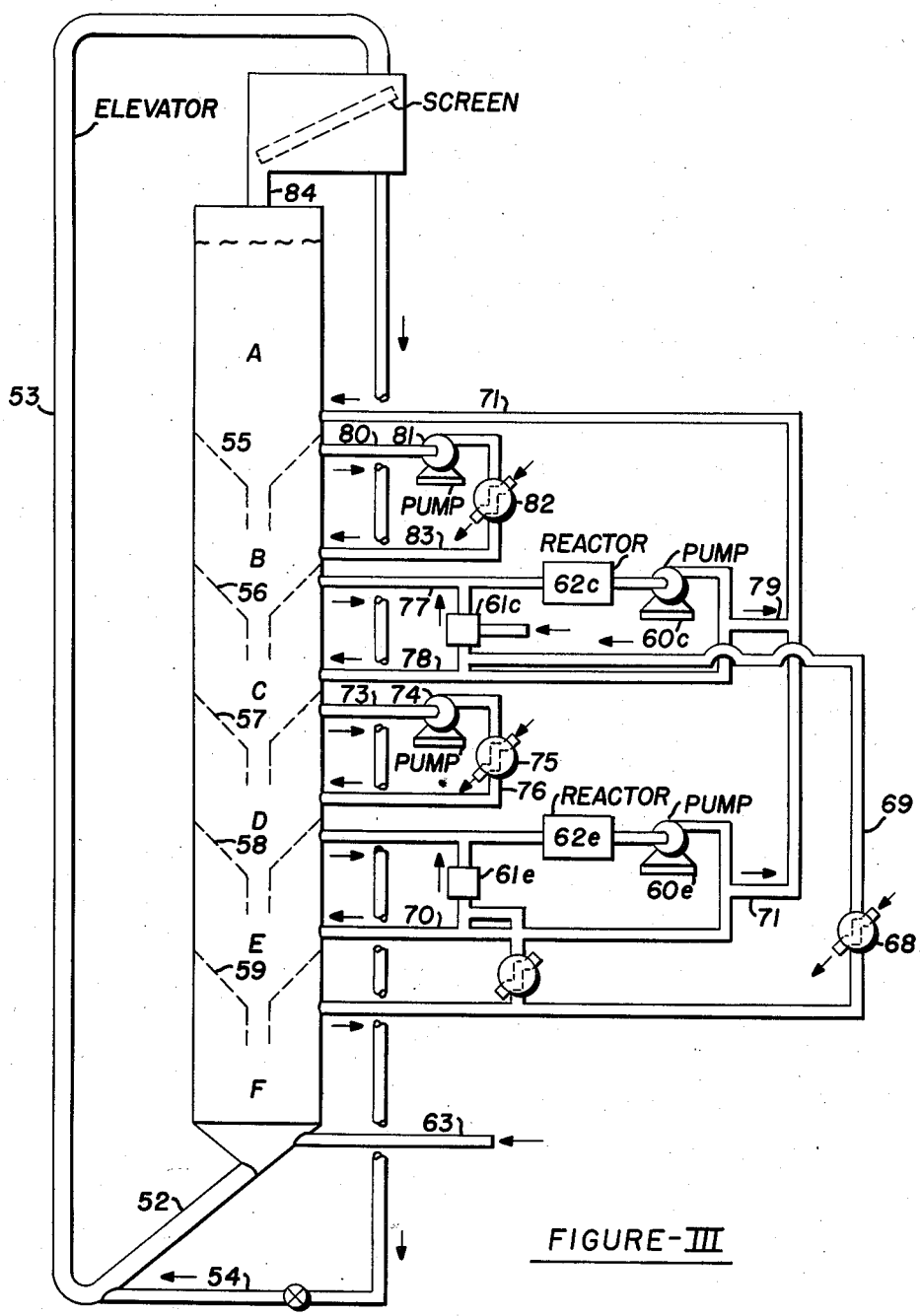
FIGURE-III

United States Patent Office 2,846,422
Patented Aug. 5, 1958

2,846,422

SOLID LIQUID HEAT EXCHANGE IN LOW TEMPERATURE POLYMERIZATION

Arthur D. Green, Westfield, N. J., assignor to Esso Research and Engineering Company, a corporation of Delaware Application July 19, 1954, Serial No. 444,080

3 Claims. (Cl. 260—85.3)

The present invention is concerned with an improved process for the production of polymers by low temperature polymerization processes and is more particularly concerned with an arrangement and sequence of heat exchanging stages by which improved efficiency in the exchange of heat is secured.

In accordance with the present process at least one solid heat exchange medium is circulated between the incoming polymer feed and the outgoing product stream under conditions to secure direct contact between the circulating heat exchange medium and the feed stream and product stream. The preferred modification of the present invention comprises combining the two stages of cooling the feed and heating the products in one tower with the solid materials moving downward by gravity and being continuously removed from the bottom of the tower and returned to the top.

By operating in accordance with the present invention unexpectedly desirable results are secured and the efficiency of the operation is materially improved.

It is well known in the art to carry out polymerization reactions at temperatures as low as $-100°$ C. to $-150°$ C. or lower. In such cases the feed materials must be indirectly contacted with a cold heat exchange fluid such as liquid ethylene and the like. The preparation of butyl rubber by the copolymerization of a major amount of isobutylene and a minor amount of isoprene is an example of such low temperature reactions. Recent improvements in this process involves the use of a large volume of solvent for dissolving the polymer product. By forming the polymer in solution, reactor fouling problems are greatly reduced or eliminated. However the solution is quite viscous even with low concentrations of polymer. Since heat exchange efficiency varies inversely with the solution viscosity, efficient heat exchange between reactor feed and liquid product solution results in increased heat exchange size and cost.

An improved process for transferring refrigeration from the chilled product streams to the incoming feed streams has now been found. In accordance with the present invention a solid heat transfer medium is used to transfer refrigeration between the respective streams in an efficient manner. In this process the expensive indirect heat exchangers are replaced by continuous, regenerative heat exchangers which are based on a bed of solids moving downward with counter-current flow of liquid upward in two stages. In the first stage the reacted liquid is heated from low temperatures up to approximately room temperature at the same time cooling the solid to nearly the original liquid temperature. In the second stage the cold solid is used for cooling the reactor feed from room temperature to nearly the temperature of the reactor effluent.

For a further understanding of the invention, reference may be had to the accompanying drawings, in which:

Figure 1 is a schematic diagram of one method for carrying out the invention.

Figure 2 represents another embodiment of the invention in which the cold and warm stages are combined in a single tower.

Figure 3 represents still another embodiment in which one or more reactor circuits are inserted in the middle of the continuous regenerative heat exchanger tower.

Referring now to Figure 1 a warm feed mixture at 110° F. consisting of 2.5% isoprene and 97.5% isobutylene and a hydrocarbon diluent having from 4 to 8 carbon atoms, e. g. hexane, is introduced into the bottom of a feed solid contacting zone 1. For purposes of illustration, the solids comprise steel pellets. It is to be understood that other solids, as for example metallic silver, copper, lead, zinc, aluminum or salts, such as silver iodide may be employed. The feed is introduced into the bottom of zone 1 by means of line 2 and flows upwardly between the interstices of downwardly flowing cold steel pellets. Feed at a temperature of about $-113°$ F. is withdrawn from the top of zone 1 by means of line 3 and is subsequently passed to a reaction zone (not shown) where it is contacted with aluminum chloride catalyst to form a solution of polymer in solvent. The steel pellets are introduced into the top of zone 1 at a temperature of about $-116°$ F. and are withdrawn at a temperature of about 104° F. by line 4. The pellets are moved by means of bucket conveyor arrangement 5 or similar means to line 6 where they are introduced into the top of product-solid contacting zone 7. Product from the reaction zone (not shown) consisting of a solution of polymer in hexane is introduced at a temperature of about $-120°$ F. into the bottom of product-solid contacting zone 7 by line 8. This product flows upwardly between the interstices of the steel pellets and is withdrawn from the upper part of zone 7 at a temperature of about 96° F. by line 9. The steel pellets are withdrawn from zone 7 by line 10 at a temperature of $-116°$ F. and passed to bucket conveyor or other elevator 11 by which they are carried to line 12 and reintroduced into the top of feed-lead contacting zone 1.

A more practical embodiment of the invention is shown in Figure 2. Here the two stages are combined in one tower with the solid particles moving downward slowly by gravity, the solids being continuously removed from the bottom of the tower and returned to the top.

Referring now to Figure 2 a feed mixture similar to that used in Figure 1, is fed at room temperature to the bottom of continuous regenerative heat exchanger tower 21 by line 22. Tower 21 is separated into a top section 23 and a bottom section 24. The top and bottom sections of tower 21 are separated by a narrow necked down opening 25 joining frustro-conical partitions 26 and 27. The feed passes countercurrently to downwardly falling steel pellets introduced at the top of the tower. Cold feed at about $-113°$ F. is drawn off below partition 27 through line 28 and fed to circulating reactor system 29 consisting of pump 30, venturi injector 31, heat exchanger 32, time tank 33 and connecting lines. Catalyst, e. g. aluminum bromide dissolved in hexane, is fed into the circulating system 29 through line 34 and venturi 31. Heat exchanger 32 is refrigerated by boiling liquid ethylene at $-155°$ F. Effluent polymer solution is continuously drawn off from the circulating system by line 35 and the catalyst is destroyed by the addition of ammonia or other quenching agent through line 36. The level of reacting liquid in time tank 33 is controlled by orifice valve 37 operated in a conventional manner by liquid level controlling means 38 in the time tank 33. Quenched cold effluent is introduced by line 39 into the middle of tower 21 just below partition 26 where it contacts warm solid steel pellets flowing down the tower. Control valve 40 is connected across lines 28 and 39 so that a small amount of feed flowing in line 28 is allowed to by-pass into the reacted liquid in order to provide adequate liquid seal in the middle of tower 21. This results in a pressure drop across partitions 26 and 27 and prevents excessive intermixing of cold feed and cold reacted liquid.

A dilute solution of polymer containing about 5 wt. percent of polymer leaves the top of tower 21 at room temperature through line 41. Warm solid steel pellets are withdrawn from the bottom of tower 21 through line 42 and passed to elevator 43 where they contact a jet of liquid suitably of the same character as the feed composition, which conveys the solids to the top of the tower through line 44. At the top of the tower solid pellets are separated from liquid by means of screen 45. Solid pellets fall by line 46 into the top of tower 21 while the liquid is conveyed by line 47 to line 44.

In the above embodiment of Figure 2, the reactor circuit still contains an indirect heat exchanger cooled by boiling ethylene for the purpose of removing the heat of reaction. This heat exchanger can become rather large and expensive due to the high viscosity of the liquid circulating in the reactor system. Consequently in order to make this exchanger of reasonable size and cost, the concentration of the polymer must be kept to a fairly low value, e. g. 2 to 5 wt. percent, to avoid an excessively viscous solution. Such an indirect heat exchanger can be avoided by employing an adiabatic reactor. However, in practice, it is very difficult to achieve adiabatic conditions at such low temperatures. For that reason the scheme illustrated in Figure 3 offers a more practical solution of the problem of handling viscous liquids. This is accomplished by inserting in the middle of the continuous regenerative heat exchanger tower one or more stages each of which contains one reactor circuit and one cooling circuit. The advantage of this scheme is that the same rate of flow of metal balls that is required for heating the reacted solution and for cooling the feed is used for removal of the heat reaction.

Referring now to Figure 3 a bed of metal pellets move slowly down through a vertical column 51. Tower 51 is divided by conical partitions 55, 56, 57, 58 and 59 into sections A, B, C, D, E, and F. Sections A and F correspond to the upper and lower sections of tower 21 of Figure 2 and are for the purpose of heating the cold reacted liquid product and for cooling the warm feed. Sections C and E are part of two reactor circuits which include pumps 60c and 60e, injection nozzles 61c and 61e and time tanks 62c and 62e. Sections B and D are part of two cooling circuits which serve the two reactor circuits. The purpose of these circuits is to lower the temperature of the pellets preparatory to using them for absorbing the heat of the reaction in the reactor circuits and is accomplished by pumping non-viscous fluid through the pellets and through an indirect heat exchanger cooled by boiling ethylene. The non-viscous liquid may suitably be fresh feed. As the metal pellets descend through section A they contact the reactant product withdrawn from reactor circuits associated with sections C and E by line 71. This reactant product is at a temperature of $-120°$ F. and cools the metal pellets correspondingly. Warm product is removed from the top of tower 51 through line 84. The cold metal pellets pass through conical partition 55 into section B where they contact fresh feed circulating at a temperature between $-120$ and $-140°$ F. through line 80, pump 81 and ethylene exchanger 82 and line 83. The pellets at a temperature of $-140°$ F. pass through conical partition 56 into section C where they meet reactant product circulated through associated reactor circuit. Thus the product is removed at a temperature of $-140°$ F. from the top of section C through line 77 and passes into time tank 62c from which it is pumped by pump 60c through catalyst injector 61c and back into time tank 62c. A portion of the reaction product is withdrawn from the circuit by line 78 and reintroduced into the bottom of section C. Another portion of the reaction product is withdrawn through line 79 from which the product passes by line 71 into the bottom portion of section A. The metal pellets at a temperature of $-120°$ F. descend through conical partition 57 into section D where they meet fresh feed cooled to $-140°$ F. by circulating through line 73, pump 74, ethylene exchanger 75, and line 76. The metal pellets at a temperature of $-140°$ F. then pass through conical partition 58 into section E where they meet reactor products at a temperature of $-140°$ F. This reactor product is continuously circulating through the reactor circuit associated with section E. In this circuit it is withdrawn from the top of section E through time tank 62e and then passes by pump 60e through catalyst injector 61e back into time tank 62e. A portion of the reactor product at a temperature of $-120°$ F. is withdrawn from the circulating liquid through line 70 and reintroduced into the lower portion of section E. Another portion of the reactor product is withdrawn from the circuit through line 71 and is passed at a temperature of $-120°$ F. into the bottom portion of section A. The metal pellets finally pass through conical partition 59 into section F where they contact fresh feed introduced by line 63 at a temperature of $-120°$ F. This feed consists of a mixture of hexane, isobutylene, and isoprene as described in Figure 2. The fresh feed is thus cooled to a temperature of $-120°$ F. in section F and is passed through line 64 and divided into two streams. One stream passes by line 65 through ethylene exchanger 66 and line 67 into the reactor circuit associated with section E. The other stream passes through ethylene heat exchanger 68 and line 69 into the reactor circuit associated with section C. Metal pellets at a temperature of $-120°$ F. are withdrawn from the bottom of section F through line 52 and recycled to the top of tower 51 by line 53 by means of a high velocity liquid stream from line 54, or as desired by means of a bucket conveyor or other equivalent means. Thus the metal pellets pass through column 51 and alternatively contact a circulating cooling liquid and a circulating reactant liquid in four stages.

In the above description it has been assumed that the metal pellets would be heated 20°, i. e. from $-140°$ to $-120°$ F. by the heat of polymerization, in each of the two reactor circuits. The amount of heat transferred in sections A and F is about 12,000 B. t. u./100 lbs. of feed, taking the liquid specific heat as 0.5. In each reactor circuit the metal pellets, therefore absorb 1000 B. t. u., while the difference in sensible heat of the feed and the product amounts to $50 \times 0.5 \times 20 = 500$ B. t. u. Thus the total heat taken out in the two reactors is $2 \times 1000 + 2 \times 500 = 3000$ B. t. u. Since the heat of polymerization is 500 B. t. u./lb., 3,000 divided by 500 equals 6 lbs. of polymer made per 100 lb. of feed, i. e. the product contains 6 wt. percent of polymer.

The essential novelty of this process resides in the storage of refrigeration in the circulating solid and its bodily transport within the solid to a zone where it can be utilized.

The basic invention of a one-tower, moving solids, regenerative heat exchanger system, with controlled leakage from one section to the other, is not limited to application in production of polymers by low temperature polymerization. It can be used effectively for heat exchange of any viscous liquid with another viscous or non-viscous liquid. It is also applicable to heat exchange of a gas with another gas or liquid, where otherwise very large and expensive indirect heat exchangers would be required.

The nature of the present invention having been thus fully set forth and specific illustration of the same given, what is claimed as new and useful and desired to be secured by Letters Patent is:

1. In a process for carrying out reactions wherein a feed stream is processed at low temperatures to yield a cold product stream and wherein the feed stream is cooled by heat exchange with the product stream, the improvement which comprises maintaining a downwardly moving body of solid heat transfer medium in a heat exchange zone, having an upper section and a lower section, introducing warm solid heat transfer medium into the top of said upper section, withdrawing warm solid heat transfer medium from the bottom of said lower section, and returning said heat transfer medium to the top of said upper section, introducing said cold product stream into the bottom of said upper section countercurrent to said moving bed of solid transfer medium whereby said product stream is warmed and said solid transfer medium is chilled, simultaneously introducing the incoming feed stream into the bottom of said lower section countercurrent to said moving solid transfer medium whereby said solid transfer medium is warmed and said feed stream is chilled, withdrawing warm product from the top of said upper section, withdrawing chilled feed from the top of said lower section and maintaining a pressure drop between the upper and lower sections whereby 1 to 5 wt.% fresh feed from the upper part of the lower section passes into the lower part of said upper section.

2. In a process for carrying out reactions wherein a feed stream is processed at low temperatures to yield a cold product stream and wherein the feed stream is cooled by heat exchange with the product stream, the improvement which comprises maintaining a downwardly moving body of solid heat transfer medium in a heat exchange zone, having an upper section, a lower section, and an intermediate cooling and reactor section, and a reactor circuit associated with said reactor section, introducing warm solid heat transfer medium into the top of said upper section, withdrawing warm solid heat transfer medium from the bottom of said lower section, and returning said heat transfer medium to the top of said upper section, introducing the incoming feed stream into the bottom of said lower section countercurrent to said moving solid transfer medium whereby said solid transfer medium is warmed and said feed stream is chilled, withdrawing chilled feed from the top of said lower section and withdrawing cold feed from the top of said lower section and passing it to said reaction circuit, withdrawing a first stream of cold reaction product from said reaction circuit and introducing it into the bottom of said upper section countercurrent to said moving bed of solid transfer medium whereby said product stream is warmed and said solid transfer medium is chilled, withdrawing a second stream of reaction product from said reaction circuit and introducing it into the lower portion of the associated reaction section countercurrent to said moving bed of solid transfer medium whereby the heat of reaction is withdrawn therefrom, withdrawing the thus cooled product stream from the top of the reaction section and returning it to the said reaction circuit, introducing a cold liquid into the bottom of said cooling section, passing said cold liquid counter-current to said moving bed of solid transfer medium whereby said solid transfer medium is chilled and said circulating liquid is warmed, withdrawing warm liquid from the top of the said cooling section, cooling said liquid and returning it to the bottom of said cooling section, and maintaining the upper section and the reactor section of the heat exchange zone at a lower pressure than the lower section and the cooling section.

3. In a process for carrying out reactions wherein a feed stream is processed at low temperatures to yield a cold product stream and wherein the feed stream is cooled by heat exchange with the product stream, the improvement which comprises maintaining a downwardly moving body of solid heat transfer medium in a heat exchange zone, having an upper section and lower section and intermediate thereof upper and lower cooling sections alternating with upper and lower reaction sections, and a reactor circuit associated with each reactor section, introducing warm solid heat transfer medium into the top of said upper section, withdrawing warm solid heat transfer medium from the bottom of said lower section and returning said heat transfer medium to the top of said upper section, introducing the incoming feed stream into the bottom of said lower section countercurrent to said moving solid transfer medium whereby said solid transfer medium is warmed and said feed stream is chilled, withdrawing chilled feed from the top of said lower section dividing said chilled feed into a first and a second feed stream, passing said first feed stream into said lower reaction circuit and passing said second feed stream into said upper reaction circuit, withdrawing a first stream of cold reaction product from each of said reaction circuits and introducing said first stream of reaction product into the lower part of said upper section countercurrent to said moving bed of solid transfer medium whereby said product stream is warmed and said solid transfer medium is chilled, withdrawing a second stream of reaction product from each reaction circuit and introducing it into the lower portion of the associated reaction section countercurrent to said moving bed of solid transfer medium whereby the heat of reaction is withdrawn from said second product stream, withdrawing the thus cooled second product stream from the top of each reaction section and returning it to its associated reaction circuit, introducing a cold liquid into the bottom of each cooling section, passing said cold liquid countercurrent to said moving bed of solid transfer medium whereby said solid transfer medium is chilled and said circulating liquid is warmed, withdrawing warm liquid from the top of each cooling section, cooling said liquid and returning it to the bottom of said cooling section, and maintaining the upper section and the reaction sections of the heat exchange zone at a lower pressure than the lower section and cooling sections.

References Cited in the file of this patent

UNITED STATES PATENTS

| | | |
|---|---|---|
| 1,614,387 | Pereda | Jan. 11, 1927 |
| 2,401,754 | Green | June 11, 1946 |
| 2,560,469 | Ogorzaly | July 10, 1951 |
| 2,592,783 | Aspegren | Apr. 15, 1952 |
| 2,690,057 | Eastwood | Sept. 28, 1954 |